(12) United States Patent
Beeck et al.

(10) Patent No.: US 6,644,920 B2
(45) Date of Patent: Nov. 11, 2003

(54) METHOD FOR PROVIDING A CURVED COOLING CHANNEL IN A GAS TURBINE COMPONENT AS WELL AS COOLABLE BLADE FOR A GAS TURBINE COMPONENT

(75) Inventors: Alexander Beeck, Orlando, FL (US); Bernhard Weigand, Filderstadt (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/991,970

(22) Filed: Nov. 26, 2001

(65) Prior Publication Data

US 2002/0127104 A1 Sep. 12, 2002

(30) Foreign Application Priority Data

Dec. 2, 2000 (DE) .......................................... 100 59 997

(51) Int. Cl.[7] ................................................. F01D 5/18
(52) U.S. Cl. ..................... 416/97 R; 416/95; 416/97 A; 416/193 A; 29/889.721; 205/665; 205/686; 204/212; 204/224 M; 204/225; 219/69.17
(58) Field of Search ................................. 416/95, 96 R, 416/96 A, 97 R, 97 A, 193 A; 415/115, 116; 29/889.721, 889.722; 205/665, 686; 204/212, 225, 224 M; 219/69.17, 69.2

(56) References Cited

U.S. PATENT DOCUMENTS

| 2,902,584 | A | * | 9/1959 | Ullmann ................ 204/224 M |
| 3,156,808 | A | * | 11/1964 | Davies et al. .......... 204/224 M |
| 3,402,279 | A | * | 9/1968 | Sazhin .................... 219/69.17 |
| 3,506,800 | A | * | 4/1970 | O'Connor ................ 219/69.2 |
| 4,684,322 | A | * | 8/1987 | Clifford et al. ............... 416/95 |
| 4,767,268 | A | * | 8/1988 | Auxier et al. ............ 416/97 R |
| 4,769,118 | A | * | 9/1988 | Johns .................... 204/224 M |
| 5,029,759 | A | * | 7/1991 | Weber ..................... 219/69.17 |
| 5,486,093 | A | * | 1/1996 | Auxier et al. ............ 416/97 R |
| 5,637,239 | A | * | 6/1997 | Adamski et al. ....... 204/224 M |
| 6,164,912 | A | * | 12/2000 | Tabbita et al. ............ 416/97 R |
| 6,234,752 | B1 | * | 5/2001 | Wei et al. ................. 416/96 R |
| 2002/0094272 | A1 | * | 7/2002 | Fleck ....................... 416/97 R |

FOREIGN PATENT DOCUMENTS

| DE | 1 293 001 | | 4/1969 | |
| DE | 38 72 465 T2 | | 2/1989 | |
| EP | 0 659 978 A1 | | 6/1995 | |
| GB | 854033 A | * | 11/1960 | .............. 219/69.17 |
| SU | 493 325 | | 2/1976 | |
| SU | 904958 A | * | 2/1982 | ................. 205/686 |

* cited by examiner

Primary Examiner—Christopher Verdier
(74) Attorney, Agent, or Firm—Burns, Doane, Swecker & Mathis, L.L.P.

(57) ABSTRACT

A method of forming a curved cooling channel into a gas turbine component such as a turbine blade uses an electrode in the form of a helix. The electrode is driven to rotate around the central rotational axis of the helix and axially along the central rotational axis. A turbine blade for a gas turbine component is provided with at least one helical cooling channel.

11 Claims, 4 Drawing Sheets

METHOD FOR PROVIDING A CURVED COOLING CHANNEL IN A GAS TURBINE COMPONENT AS WELL AS COOLABLE BLADE FOR A GAS TURBINE COMPONENT

FIELD OF THE INVENTION

The invention relates to a method for providing a curved cooling channel in a gas turbine component. The invention furthermore relates to a coolable blade for a gas turbine component having at least one curved cooling channel.

BACKGROUND OF THE INVENTION

In general, cooling channels in gas turbine components are designed in the form of open passageways that extend along straight line axes. In a number of applications, such as, for example, gas turbine blades subject to high thermal loads and having complex geometries, it is difficult to form cooling channels in a suitable manner for especially highly loaded sections. Points on the blades that are hard to access, such as, for example, in the transition area between the blade hub and the platform or in wall sections with high thermal loads, may require cooling channels having axes that do not extend linearly. A cooling channel that curves three-dimensionally in space would have to be provided in such locations.

European publication EP 0 659 978 A1 discloses a coolable turbine blade that is constructed in a known manner to include a blade hub, a blade root, and a platform. The blade hub includes a suction-side wall and a pressure-side wall that are connected with each other along a leading edge and a trailing edge, with a cavity formed in between the suction-side wall and the pressure-side wall. Curved channels are provided in the region of the blade tip.

With respect to providing the curved channels, general reference is made to electrochemical processes and also to laser beam drilling. However, European publication EP 0 659 978 A1 does not provide further details related to this. The curved channels shown in this publication have also been positioned in the region of the blade tip. Starting from the pressure side of the blade, the curved channels extend to the blade tip. Accordingly, the area where the curved channels are formed is easily accessible, and the curved channels can be formed without great difficulty. Difficulties are encountered, however, when attempting to form curved channels in areas of a gas turbine blade that are hard to access.

SUMMARY OF THE INVENTION

In view of the above-discussed difficulties, the invention is directed to a method for forming curved cooling channels, even in regions of the blades that are hard to access. The invention also is directed to a coolable blade for a gas turbine component, in particular a turbine blade, that is provided with a curved cooling channel that enables the required heat removal even at positions on the blade that are hard to access.

According to an embodiment of the invention, a method for forming the curved cooling channels in regions of the blade that are hard to access utilizes an electrode in the form of a helix. The electrode is driven during the formation of the cooling channel so as to rotate around its central rotational axis, resulting in a curved channel in a helical shape. This makes it possible to provide in a simple manner cooling channels in areas subjected to high thermal loads, especially at the transition areas between the blade platform and the blade hub, or in the wall of the blade hub.

The electrode is positioned axially movable in relation to the rotational axis so as to permit the corresponding advance of the electrode according to the pitch of the helix. The electrode is preferably driven in a forcibly coupled manner, moving axially and rotating relative to the rotational axis. This ensures that the electrode is guided optimally in the respective channel section that was just created.

The method according to the invention allows for the selection of a variety of cross-sectional shapes for the electrode wire to form cooling channels having any desired cross section. Examples of cooling channel cross-sections can include rectangular cross-sections, circular cross-sections and ellipsoid cross-sections, with the cross-section chosen to ensure optimum flow conditions within the cooling channel.

Even though the method described above can be used in practically all gas turbine components, it is used preferably in coolable blades.

A coolable blade constructed according to an embodiment of the invention preferably includes a cooling channel with at least one section having a helical shape. Such cooling channels enable an extremely efficient cooling of the blade, especially in regions that are subject to especially strong thermal stresses. The cooling channels according to the invention can be provided in regions of the blade that are hard to access, such as the transition area from blade hub to platform or in wall areas of the blade hub that are subject to especially high loads due to hot gas, and allow for optimal cooling of these regions.

In a preferred embodiment of the invention, a blade is provided with the at least partially helical cooling channels in the wall of the blade hub. The cooling channel can extend substantially continuously over the entire height of the blade hub, thereby allowing for even cooling of the blade hub in the direction of the blade height. Such a cooling channel also can be produced economically using the method of the invention since it can be drilled in a single working step.

Depending on the thermal load introduced by hot gas flow, it may be advantageous to provide several cooling channels that are separate from each other. For example, several laterally juxtaposed cooling channels can be provided. In the area of the leading edge, three to five of these cooling channels can be provided with their axes arranged substantially parallel to each other in order to always ensure a safe cooling of the corresponding wall section in case of a potential shifting of the stagnation point.

In another embodiment, the cooling channels can be arranged below each other. In this case, the cooling channels do not extend continuously over the entire height of the blade hub, but only over a specific partial section. This makes it possible to account for the thermal load that varies over the blade height, and to provide cooling channels at the places where the thermal load is highest. This configuration also makes it possible to increase the cooling power since the cooling medium is added and removed at several places along the blade height.

In another embodiment several cooling channels can be stacked inside each other. The radial and/or axial offset of the individual cooling channels is selected so that they all extend separately from each other. This allows a strong cooling effect at places with especially high thermal loads without weakening the cross-section of the wall too much.

According to another aspect of the invention, ejection openings can be provided for forming a cooling film. The ejection openings are designed as so-called film cooling holes that start from the cooling channel and end at the surface of the blade hub. A suitable design of the helical extension of the cooling channel makes it possible to achieve an optimum cooling film. The optimum cooling film is also supported by the swirl of the cooling air flow created by the helical shape.

Another important application of the invention relates to providing such a cooling channel in the transition area from the blade hub to the platform. This transition area usually has a transition radius that is subject to very large thermal and mechanical loads. This area therefore must be cooled in a targeted manner in order to not exceed the maximum permissible load values.

It is preferred that the cooling channel is provided with several supply and outlet channels so that the coolant is not excessively heated when flowing through the cooling channel. Such a cooling channel can be created in a simple manner since during the forming of the cooling channel, the helical electrode is positioned so that only one angle sector of one turn extends inside the blade, and the remaining sector is located in the area of a cavity through which the coolant flows. This creates several cooling channel sections located on top of each other, which can be supplied optimally by the coolant flowing in the cavity.

BRIEF DESCRIPTION OF THE DRAWINGS

The drawings show exemplary embodiments of the invention in schematic form.

DETAILED DESCRIPTION OF THE PREFERRED EMBODIMENTS

Figure 1:
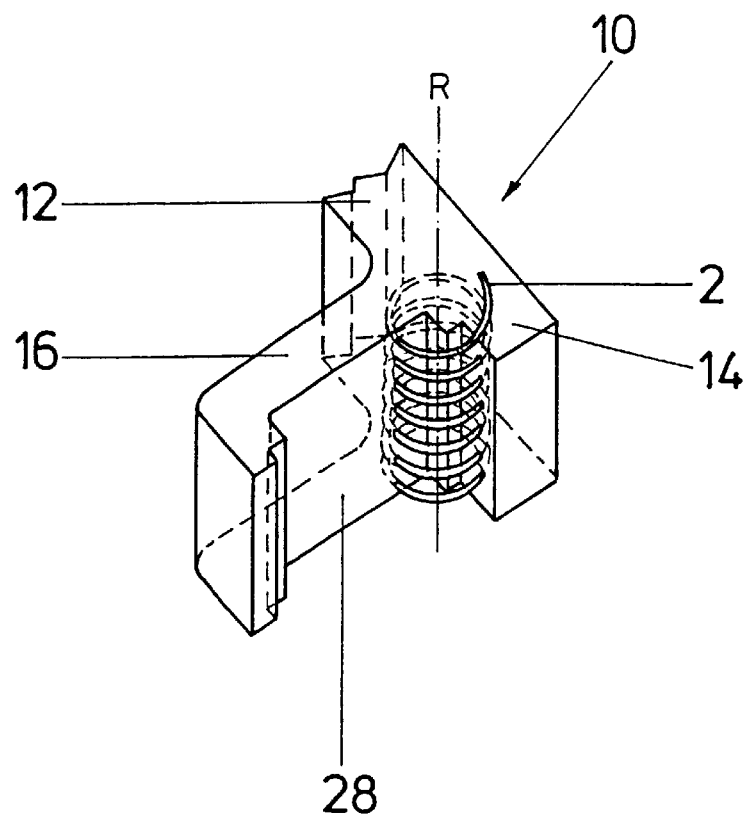
FIG. 1 shows a perspective view, partially in phantom, of a blade section with an electrode forming a cooling channel according to an embodiment of the invention.
Figure 2:
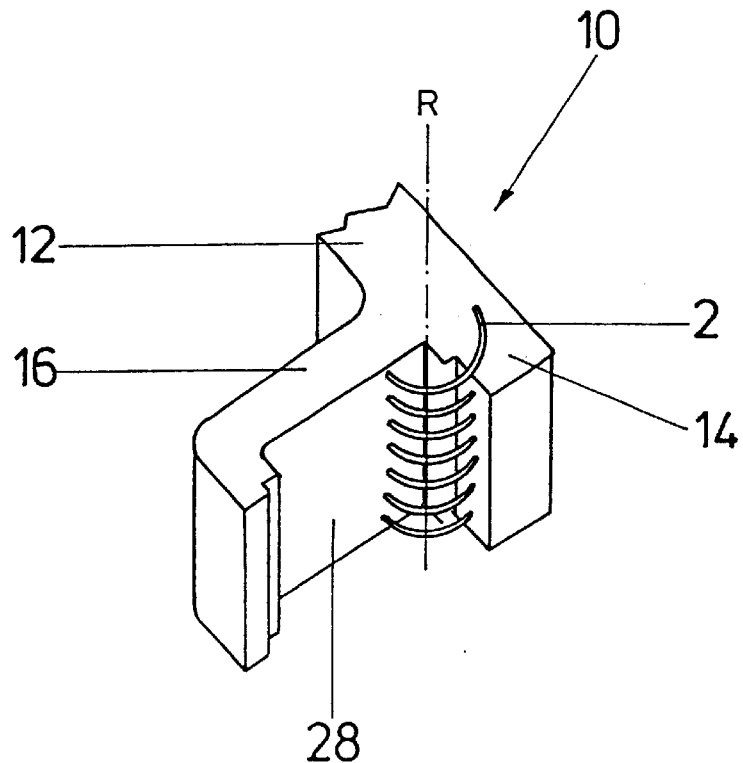
FIG. 2 shows a perspective view of a blade section with an electrode forming a cooling channel.
Figure 3:
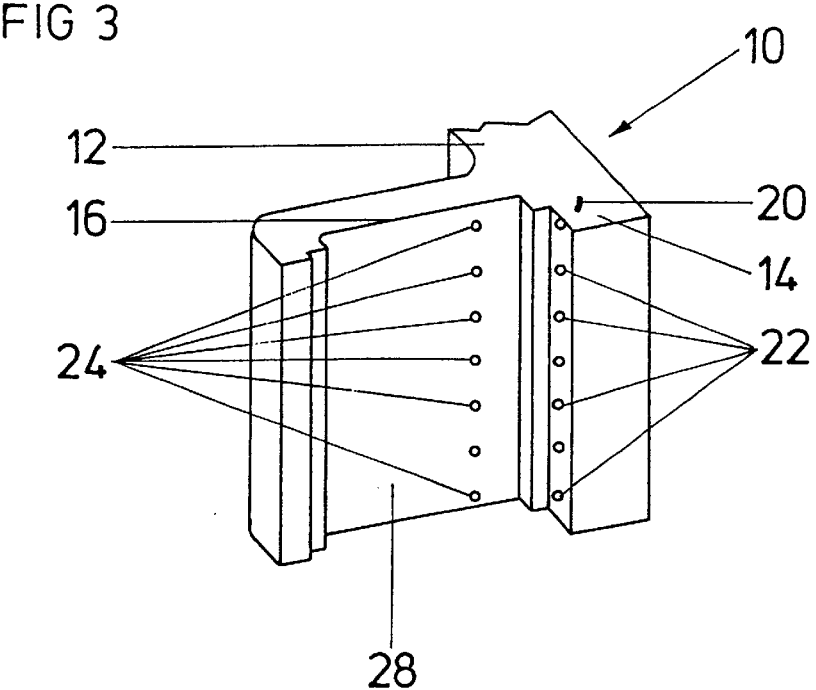
FIG. 3 shows a perspective view of a blade section with cooling channels formed by an electrode according to the invention.

The method according to the invention is explained with reference to the exemplary embodiment shown in FIGS. 1 to 3, illustrating the section of a blade 10 in the transition area from a blade hub 12 to a platform 16. Below the platform 16, a cavity 28 is formed, which is limited on one side by the platform 16, and on the other side by a blade root 14, and whose function is explained in more detail below.

According to the invention, an electrode in the shape of a helix 2 is used and is driven so as to rotate around its rotational axis R. Forcibly coupled with the rotational movement, the electrode 2 is also driven in an axial direction, causing the electrode 2 to advance into the material in the area of the platform 16 and of the blade root 14. A spark erosion method, electrical discharge machining, electrochemical drilling, or other known processes can be used with the electrode and processes according to the invention.

The coupled rotational and axial movement causes the electrode 2 to be driven forward along a helical path. This creates a helical channel such as cooling channel 20 that is formed in the section processed by the electrode 2. If the electrode is positioned completely within a portion of the blade, such as the platform 16, a continuous cooling channel 20 is created.

In the exemplary embodiment shown in FIGS. 1–3, the electrode 2 is positioned in relation to the platform 16 and the blade root 14 in such a way that, when seen from the top, an angle sector is located in the area of the cavity 28. The electrode 2 therefore exits the blade root 14 in each case, and enters the area of the platform 16 following another rotation of about 90°. This does not create a single, continuous cooling channel 20, but a plurality of parallel extending channel sections with inlet openings 22 and outlet openings 24.

The geometric design of the helix 2 can be varied depending on the desired results. The pitch of the helix 2 determines the amount of axial movement of the electrode relative to the rotation of the electrode. Forcible coupling of the rotation of the electrode with its axial movement is generally only needed at the beginning of the drilling process as long as the electrode has sufficient mechanical stability since the helix 2 is guided in the already drilled section.

Figure 4:
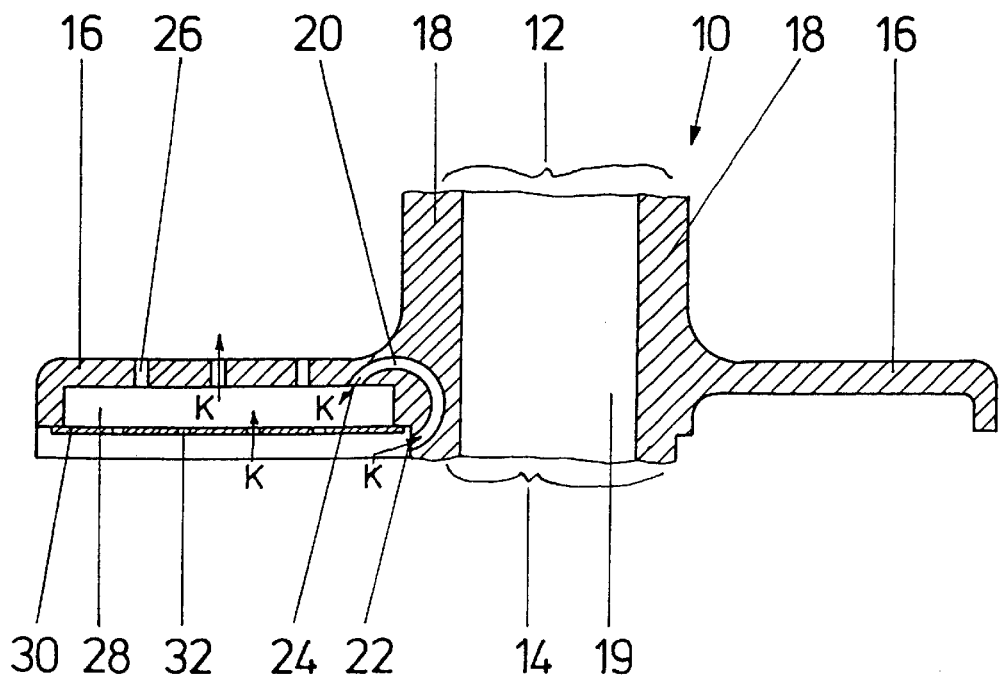
FIG. 4 shows a cross-sectional view of a blade section with cooling channels according to a first embodiment of the invention.
Figure 5:
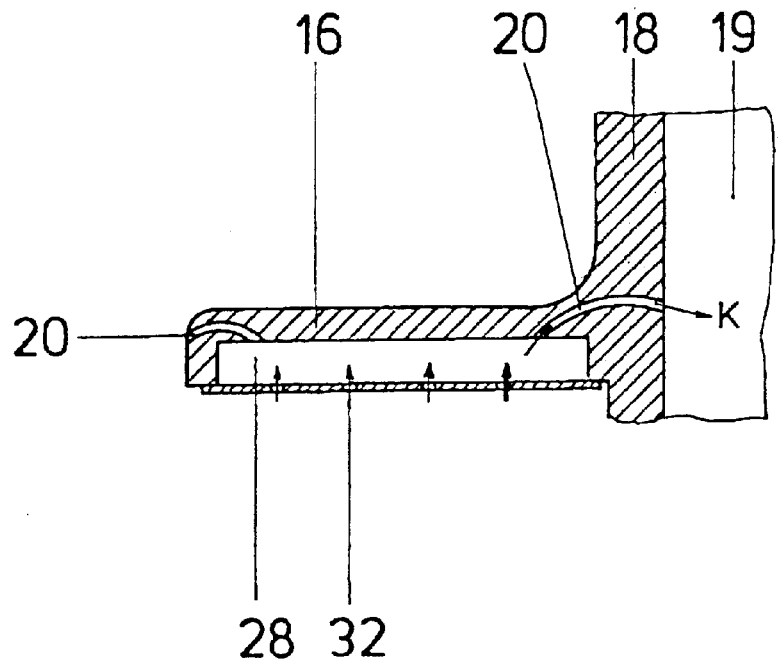
FIG. 5 shows a cross-sectional view of a blade section with cooling channels according to a second embodiment of the invention.
Figure 6:
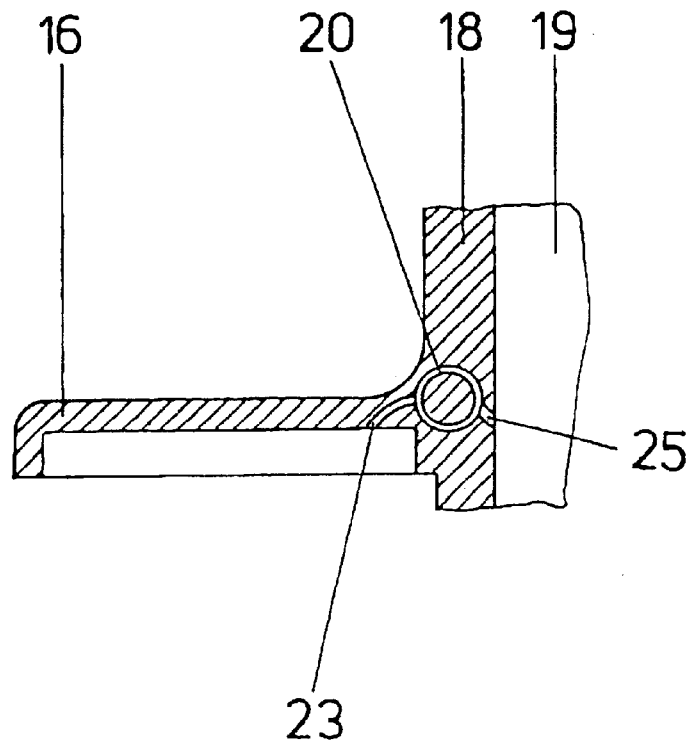
FIG. 6 shows a cross-sectional view of a blade section with cooling channels according to a third embodiment of the invention.

The embodiments shown in FIGS. 4 to 6 show different possibilities for using such cooling channels in order to realize different cooling concepts in the transition area between the blade hub and platform. Because of the small radius at this point, in connection with the high thermal loads, this transition area is especially at risk and therefore must be cooled optimally.

FIG. 4 shows a blade 10 with a blade hub 12, a blade root 14, and a platform 16. The blade hub 12 is constructed hollow, i.e., a cavity 19 exists between the walls 18, whereby a coolant K can flow through said cavity (not shown here).

In the transition area between blade hub 12 or blade root 14 and platform 16, a helically extending cooling channel 20 is illustrated. An inlet opening 22 is provided in the area of the blade root 14, and an outlet opening 24 is provided in the area of the platform 16. Below the platform 16, a baffle plate 30 is positioned so that a cavity 28 is created between the platform 16 and the baffle plate 30.

The baffle plate 30 has baffle holes 32, through which the coolant K first enters the cavity 28, and from there leaves the blade 10 in the area of the platform 16 through ejection openings in the form of film holes 26.

A portion of the cooling air flow K furthermore flows through the inlet opening 22 located in the area of the blade root 14 below the baffle plate 30. As a result of the pressure differential between this area and the cavity 28, this portion of the cooling air flow K flows through the cooling channel 20, and exits from the cooling channel through the outlet opening 24 in the area of the cavity 28. There, it is mixed with the remaining coolant K and exits the blade 10 through the film holes 26.

As illustrated in particular in FIG. 3, a plurality of inlet openings 22 and outlet openings 24 are provided, enabling an even cooling along a plane perpendicular to the drawing plane of FIG. 4.

FIGS. 5 and 6 show variations of the cooling channels 20 in a blade similar to that shown in FIG. 4.

The embodiment according to FIG. 5 has a first group of cooling channels 20 in the transition area between the wall 18 and the platform 16, as well as a second group of cooling channels 20 in the end portion of the platform 16. Both groups of cooling channels 20 are supplied exclusively through the cavity 28.

The embodiment shown in FIG. 6 shows a helical cooling channel 20 that is formed continuously within the wall 18 at the transition area between the wall 18 and the platform 16 in a direction perpendicular to the drawing plane of FIG. 6. The cooling channel 20 is supplied by a feeding channel 23 and has a outlet channel 25 that ends in the area of the hollow space 19. It is also possible to provide a plurality of feeding channels 23 and outlet channels 25 in order to even the cooling effect.

Figure 7:
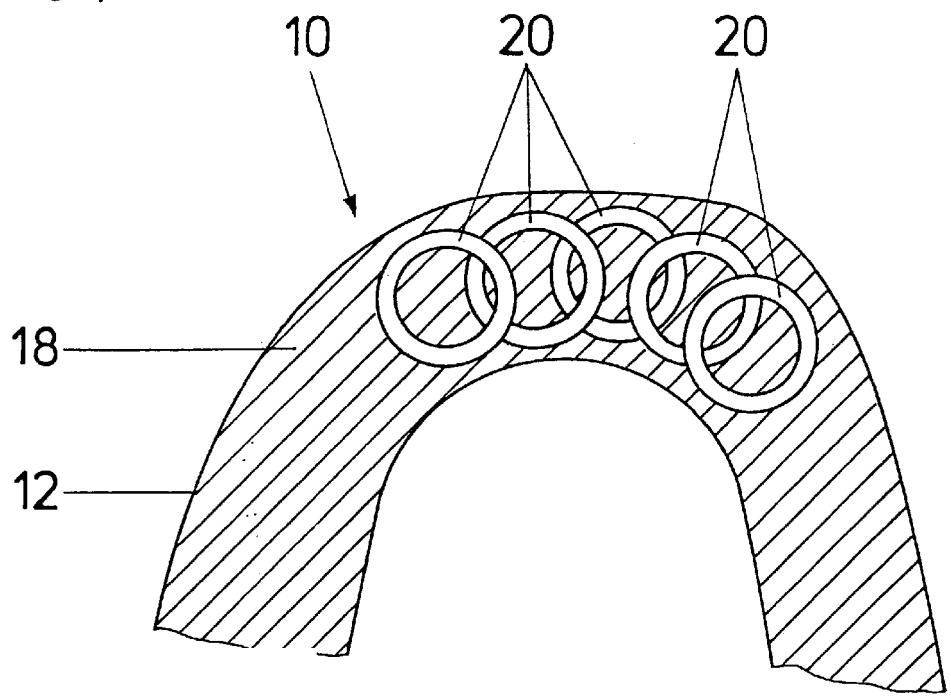
FIG. 7 shows a cross-sectional view of a wall section of a blade with cooling channels according to a first embodiment of the invention.
Figure 8:
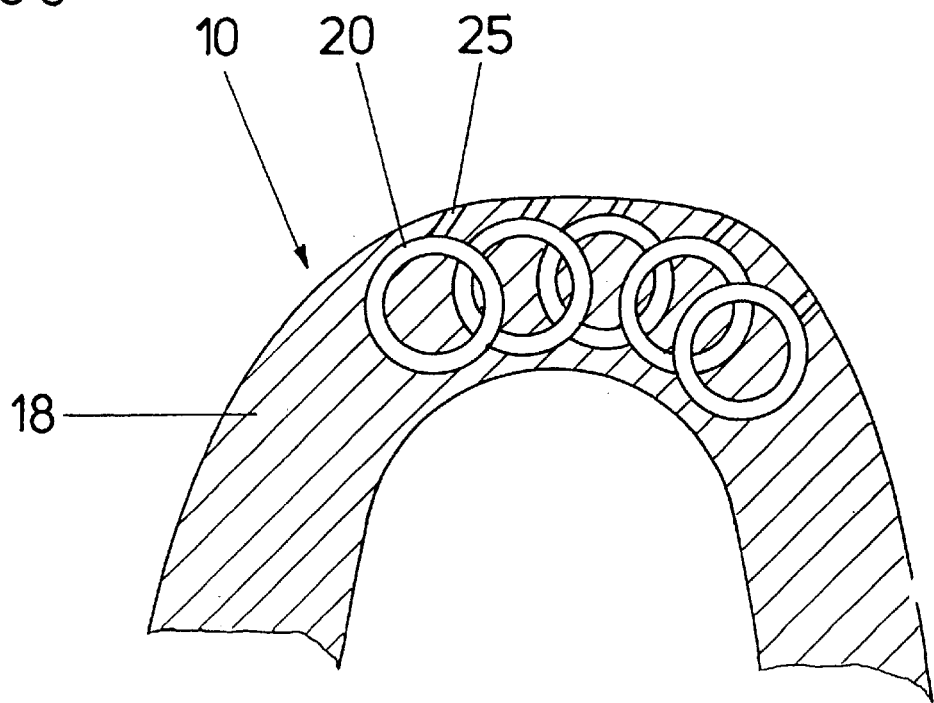
FIG. 8 shows a cross-sectional view of a wall section of a blade with cooling channels according to a second embodiment of the invention.

The embodiments shown in FIGS. 7 and 8 show cooling concepts that can be realized within a wall 18 (for example in the stagnation point area of the blade 10). Five cooling channels 20 are shown that extend substantially over the entire height of the blade hub 12 (not shown,) i.e., perpendicular to the illustrated section plane. The arrangement provides each of the cooling channels 20 extending separately from the others and at least partially overlapping with an adjacent cooling channel. The laterally and vertically stacked arrangement achieves optimal cooling of the blade.

The embodiment shown in FIG. 8 differs from the one in FIG. 7 in that outlet channels 25 have been provided. These enable the formation of a cooling film (not shown in detail).

In another variation of the embodiments shown in FIGS. 7 and 8, the individual cooling channels 20 are provided not continuously over the entire height of the blade hub. Instead, individual helical cooling channels, each having a few turns, are provided so as to be positioned on top of each other, but separate from each other. These can be arranged, for example, specifically more densely in the middle of the blade height in order to account for the local heat introduction through the hot gas flow.

The concept according to the invention makes it possible to economically realize optimum cooling concepts, and in particular to provide cooling channels even in regions that are hard to access.

What is claimed is:

1. A method of forming a curved cooling channel in a gas turbine component, comprising:

providing a helically shaped electrode having a central rotational axis and at least one 360 degree turn; and driving the electrode into the gas turbine component by rotating the electrode around the central rotational axis to advance the at least one 360 degree turn of the electrode into the gas turbine component.

2. The method according to claim 1, further including driving the electrode in the axial direction along the central rotational axis while rotating the electrode around the central rotational axis.

3. A blade for a gas turbine component, comprising:

a blade hub;

a blade root;

a platform; and at least one curved cooling channel defined within said blade, said cooling channel having at least one helical section and being provided in a transition area from the blade hub to the platform.

4. The blade according to claim 3, wherein:

the at least one curved cooling channel is defined in a wall of the blade hub.

5. The blade according to claim 4, wherein the at least one curved cooling channel extends substantially over the entire height of the blade hub.

6. The blade according to claim 4 or 5, wherein a plurality of separate curved cooling channels are provided.

7. The blade according to claim 6, wherein the cooling channels are positioned laterally next to each other.

8. The blade according to claim 6, wherein the cooling channels are positioned below each other.

9. The blade according to claim 6, wherein the cooling channels are positioned stacked at least partially inside each other.

10. The blade according to claim 4 or 5, wherein ejection openings for forming a cooling film are provided extending from the at least one curved cooling channel to an outer surface of the blade.

11. The blade according to one of claims 3–5, wherein the at least one curved cooling channel is provided with at least one of a feeding channel and an outlet channel.

* * * * *